United States Patent [19]

Rebera

[11] Patent Number: 4,817,833
[45] Date of Patent: Apr. 4, 1989

[54] VEHICLE CARRIER

[76] Inventor: Anthony J. Rebera, 3003 Avon Blvd., Ashtabula, Ohio 44004

[21] Appl. No.: 140,217

[22] Filed: Dec. 31, 1987

[51] Int. Cl.⁴ .............................................. B62J 7/00
[52] U.S. Cl. ................................... 224/36; 224/30 A; 280/202
[58] Field of Search ................. 224/30 A, 32 R, 30 R, 224/36, 39, 41, 0.5; 280/202, 302, 289 A, 289 H, 293, 295, 762, 769

[56] References Cited

U.S. PATENT DOCUMENTS

| | | | |
|---|---|---|---|
| 441,485 | 11/1890 | Greenwood | 280/202 |
| 622,500 | 4/1899 | Kuster | 280/202 |
| 855,979 | 6/1907 | Razoux | 280/202 |
| 2,576,111 | 11/1951 | Glenny et al. | 224/36 |

FOREIGN PATENT DOCUMENTS 79514  9/1931  Sweden .............................. 224/32 R Primary Examiner—Renee S. Luebke
Attorney, Agent, or Firm—Frank B. Robb

[57] ABSTRACT

A two wheeled passenger vehicle having a front wheel which is steerable by turning a handlebar to which the front wheel is connected, the vehicle having attached thereto a rigid carrier connected to the handlebar in such a manner as to be fixed for turning with the handlebar, the carrier extending sufficiently forward of the wheel and at an angle thereto whereby the lower end of the carrier will engage the surface on which the vehicle is supported and maintain the vehicle as a whole in substantially upright position.

5 Claims, 1 Drawing Sheet

VEHICLE CARRIER

BACKGROUND OF THE DISCLOSURE

This invention relates to a carrier for a vehicle such as a bicycle which is inherently unstable when it is by itself and not under operation, with the usual form of vehicle having a rear driving wheel and a front steerable wheel with a provision for an operator and means to steer the vehicle in any preferred direction.

The prior art is replete with patents of various kinds which relate to this general area of consideration, and the same are listed hereinafter without particular discussion initial reference however being made to certain of the same which are more closely related to the concept hereof but not considered to be anticipatory and in fact the references referred to in detail are only generally related to the concept hereof.

As an example of this situation, the reference Otterbein, Patent No. 740,905, has a front seat support for a bicycle which is non-rotatably attached to the front and intended to fold upwardly from the lower end when not in use It does not ever engage the ground under any circumstances, unless the operator places it on its side.

The Austrian patent to Herzberg, No. 165,161, shows a rudimentary carrier so to speak, which does not and is not intended to ever engage the ground even when turned at any angle.

The British patent of Pashley, No. 353,691, shows a carrier for a bicycle which does not turn when the front wheel is turned and only includes a leg which can be attached to and detached from a carrier for support of a bicycle but is not intended to be left in place when the cycle is moving.

A vast number of other patents listed are found in the cycle art but none incorporates or contemplates the combination of parts, mounting and rotating which is disclosed by me herein.

U.S. Pat. Nos. 648,457 to Flynn, 1,159,139 to Walk, 4,387,836 to Laesch, 2,926,927 to Enright, 3,938,719 to Carlton, 511,043 to Campbell, 3,827,613 to Meyer, 3,286,891 to Jones, Jr., And foreign patents to: France, No. 847,665, Switzerland, No. 217,657, Great Britain, No. 336,180, Great Britain, No. 12,394, Great Britain, No. 21,644.

There may be others of which I am not aware, but this seems to be a rather thorough and exhaustive reference to the prior art which has been made known to me.

As will be apparent, none of these patents is really pertinent to the instant consideration.

GENERAL DISCLOSURE OF THE INVENTION

The invention is disclosed herein by reference to the drawing wherein.

SPECIFIC DESCRIPTION OF THE INVENTION

Figure 1:
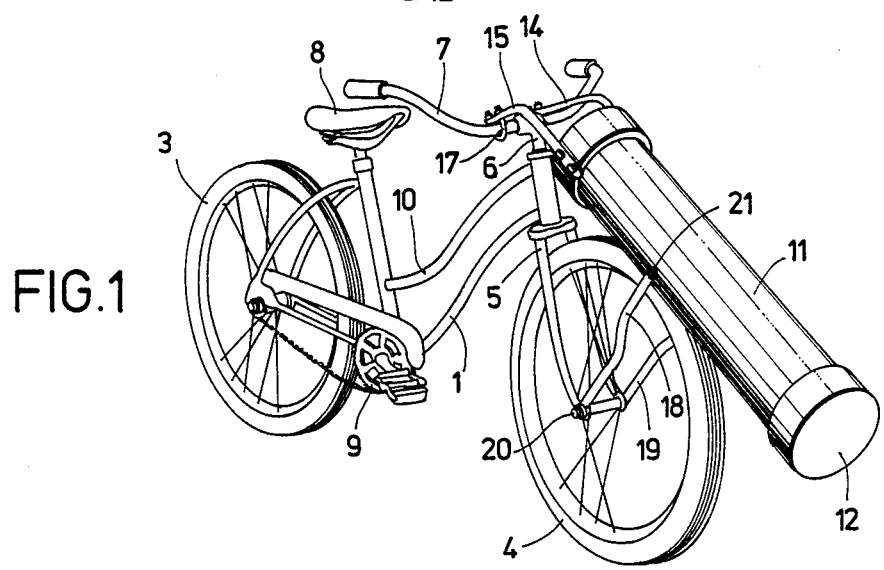
FIG. 1 is a perspective view showing a bicycle with the carrier of the concept herein mounted thereon.

Referring now to FIG. 1, the bicycle generally denoted 1 is provided with a rear driving wheel 3 and a front steerable wheel 4, which steerable wheel is mounted on a fork such as 5, which in turn extends upwardly to a shank 6 to which is connected to the usual handlebar such as 7. A driver's seat 8 is provided, the driving means including a chain and sprocket formation 9 which is of generally conventional configuration, the frame of the bicycle being designated generally at 10.

The carrier hereof designated 11, is shown in this case as being a cylindrical or tubular member of rigid construction which may be of plastic or other material having a closed bottom such as indicated at 12 and an open top at 13, the carrier 11 being suitably connected to the handlebars 7 by means of certain tubular parts 14 and 15.

These tubular parts 14 and 15 are connected to the handlebars in any preferred manner such as by the U bolts indicated in the disclosure at 17.

Figure 3:
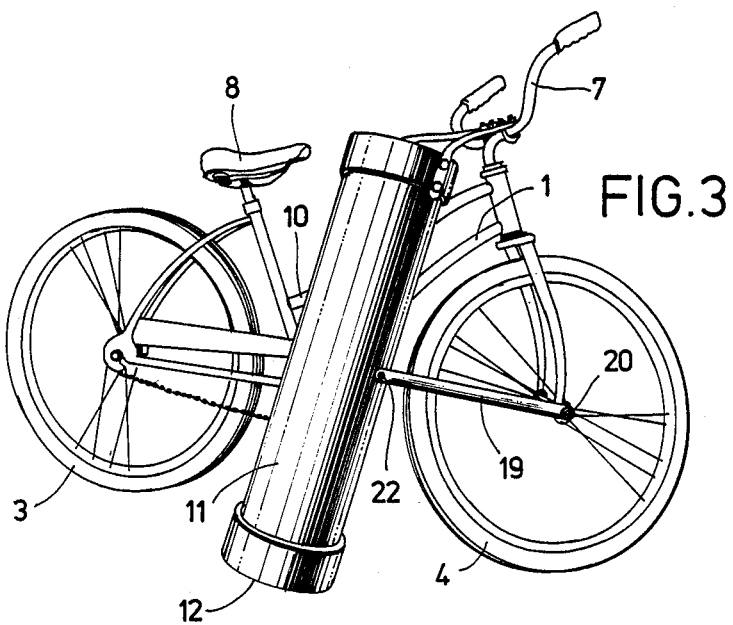
FIG. 3 is a view of the bicycle hereof with the carrier turned in a position so that it will maintain the bicycle in virtually vertical upright condition without any other means for support.

Part way along the body of the carrier 11, certain arms such as 18 and 19 are shown, which are connected at the axle area 20 of the front steering means of the bicycle and at their extremeties at 21 and 22, reference being had at this point to FIG. 3. These are arranged so that they will maintain the carrier 11 in the position as disclosed in a substantially rigid relationship to the bicycle so that the carrier will in fact turn with the turning of the front wheel in all circumstances.

It will be a apparent that this carrier may be attached to and detached from a bicycle, but is intended to be usually left in connection as shown for any suitable purpose.

Figure 2:
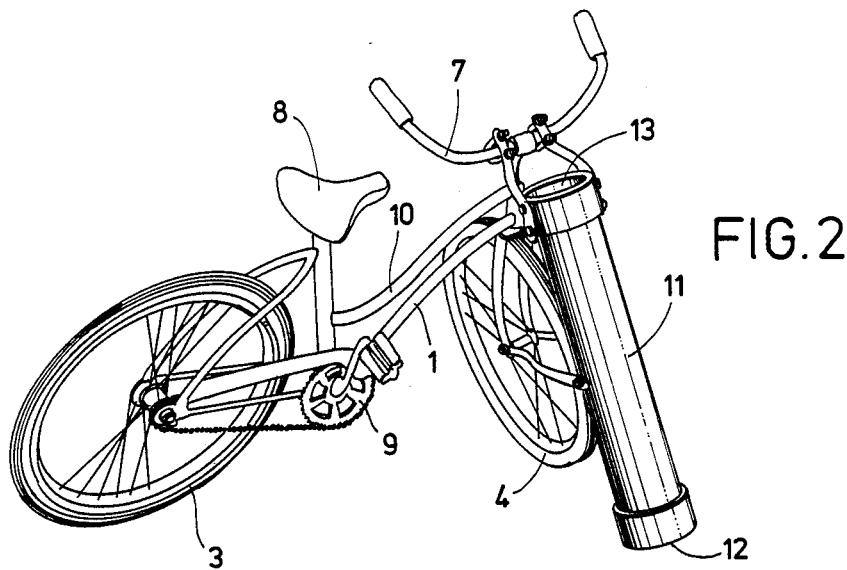
FIG. 2 is a view of the bicycle with the carrier and the front steering wheel of the bicycle turned at a particular angle to illustrate a possible position thereof.

Turning now to a consideration of FIG. 2 for example, the carrier 11 is shown as having been rotated about 90 degrees with respect to its usual fore and aft alignment and the bicycle if permitted to assume the position of FIG. 2 would in fact be maintained in that position with the end 12 of the carrier engaging the ground for support of the bicycle thereby, although not quite vertical.

The bicycle is shown in FIG. 3 with the handlebars 7 turned at a greater than right angles or more than 90 degrees so that the bottom 12 of the carrier 11 is virtually at the midpoint of the bicycle in relation to the same, that is midway between the wheels or the axes thereof.

With that in mind it will be understood that the bottom of the carrier 11 denoted 12 is in fact in engagement with the ground or supporting area upon which the bicycle is positioned and thus will maintain the bicycle in upright substantially vertical condition for any particular purpose.

It will thus be apparent that the bicycle can be left in this position with the carrier in that condition and anything in the carrier can be accessible as desired without disturbing the attitude of the bicycle.

It should be therefore understood that the turning of the handlebars will turn the wheel and its associated parts which comprise the steering means so that from an attitude in which the carrier is moving forwardly in alignment the attitude may be changed so as to support the bicycle in a parked position with the carrier being used as a means for maintaining the bicycle as desired in substantially upright position.

I claim:

1. A wheeled vehicle having a front and rear wheel and adapted to be ridden, forwardly with the wheels in alignment, the vehicle being inherently unstable when stationary, such that it will fall to one side or the other of the usual direction of travel, the front wheel of said vehicle being steerable, by steering means for turning the same on an axis to the right and left, and a carrier of elongated rigid construction mounted at the front of the vehicle to extend in alignment with and having an end extremity extending for a substantial distance ahead of the front wheel aforesaid, turning of the front wheel through a substantial arc to one side of the line of travel of the vehicle, causing the lower extremity of the carrier to engage the surface on which the wheels are supported and maintain the vehicle in substantially upright position.

2. A vehicle as claimed in claim 1, wherein the carrier includes a tubular body opened at one end and closed at the other, the body being connected near the open end to the steering means and also intermediate the ends of the body to the steering means which include the supporting front wheel so as to extend at an angle forwardly of the said wheel, the turning of the steering means at a sharp angle positioning the lower end of the body to engage the surface for the purpose stated.

3. A vehicle as claimed in claim 1, wherein the same includes steering means to be gripped and rotated by an operator of the vehicle, the carrier is rigid and connected at one end to the steering means, the carrier being further connected to the steering means to maintain said carrier in rigid relation to said means.

4. A vehicle as claimed in claim 3, wherein the carrier includes an elongated body fastened to the steering means as stated at one end, connection from the carrier to the steering means extending from a point intermediate the ends of said body to a point near the axle of the front support wheel.

5. A vehicle as claimed in claim 3, wherein the carrier is attachable to and removable from the vehicle by the connections of the same with the vehicle.

* * * * *